(12) United States Patent
Bohn et al.

(10) Patent No.: US 6,655,075 B2
(45) Date of Patent: Dec. 2, 2003

(54) WEEDLESS FISHHOOK AND METHOD OF MAKING THE SAME

(75) Inventors: Greg Bohn, Hazelhurst, WI (US); Nicholas S. Adams, East Gull Lake, MN (US); Theodore A. Takasaki, East Gull Lake, MN (US); Stephen D. Borders, Brainerd, MN (US)

(73) Assignee: Lindy Little Joe, Inc., Brainerd, MN (US)

( * ) Notice: Subject to any disclaimer, the term of this patent is extended or adjusted under 35 U.S.C. 154(b) by 0 days.

(21) Appl. No.: 10/067,105

(22) Filed: Feb. 4, 2002

(65) Prior Publication Data

US 2002/0112393 A1 Aug. 22, 2002

Related U.S. Application Data

(60) Provisional application No. 60/266,554, filed on Feb. 5, 2001.

(51) Int. Cl.[7] .............................................. A01K 83/00
(52) U.S. Cl. ....................................................... 43/43.6
(58) Field of Search ............................... 43/43.2, 43.4, 43/43.6

(56) References Cited

U.S. PATENT DOCUMENTS

| | | | | |
|---|---|---|---|---|
| 713,306 A | * | 11/1902 | Jacoby | 43/43.6 |
| 797,281 A | * | 8/1905 | Henzel | 43/43.6 |
| 816,130 A | * | 3/1906 | Shaw | 43/43.6 |
| 1,457,373 A | * | 6/1923 | Kessel | 43/43.2 |
| 2,199,001 A | * | 4/1940 | Khoenle | 43/42.15 |
| 2,219,225 A | * | 10/1940 | Gambill | 43/42.08 |
| 2,449,700 A | * | 9/1948 | Hubbard | 43/42.28 |
| 2,519,338 A | * | 8/1950 | Arnold | 43/42.29 |
| 2,615,277 A | * | 10/1952 | Hayden | 43/43.2 |
| 2,895,252 A | * | 7/1959 | Tibbetts | 43/42.5 |
| 2,917,860 A | * | 12/1959 | Norton | 43/43.2 |
| 3,142,928 A | * | 8/1964 | Adams | 43/42.42 |
| 3,191,336 A | * | 6/1965 | Cordell, Jr. | 249/95 |
| 3,221,437 A | * | 12/1965 | De Long | 43/43.4 |
| 3,605,317 A | * | 9/1971 | Pobst | 43/42.1 |
| 3,605,318 A | * | 9/1971 | Santo et al. | 43/43.4 |
| 3,750,322 A | * | 8/1973 | Putnam | 43/42.25 |
| 3,750,323 A | * | 8/1973 | Weis | 43/42.28 |
| 3,807,079 A | * | 4/1974 | Goforth | 43/42.17 |
| 3,858,343 A | * | 1/1975 | Goforth | 43/42.17 |
| 4,057,927 A | * | 11/1977 | Marlowe | 43/43.6 |
| 4,864,766 A | | 9/1989 | Bohn | 43/42.37 |
| 5,551,185 A | * | 9/1996 | Reed | 43/42.31 |

\* cited by examiner

Primary Examiner—Charles T. Jordan
Assistant Examiner—Jordan Lofdahl
(74) Attorney, Agent, or Firm—Dorsey & Whitney LLP

(57) ABSTRACT

A weedless fishhook having a plurality of individual deflector strands extending toward the free end of the hook and a method of making such weedless fishhook.

18 Claims, 4 Drawing Sheets

WEEDLESS FISHHOOK AND METHOD OF MAKING THE SAME

This application claims the benefit of Provisional Application Ser. No. 60/266,554 filed Feb. 5, 2001.

BACKGROUND OF THE INVENTION

1. Field of the Invention

This invention relates generally to the field of fishing tackle. In particular, this invention relates to a weedless fishhook or snell adapted to deflect the fishhook or snell or to deflect weeds, underwater brush, or other obstacles. The invention also relates to a method of making a weedless fishhook or snell.

2. Description of the Prior Art

Underwater brush, weeds or debris present one of the many obstacles facing a fisherman. Although underwater brush and weeds are attractive habitat for many varieties of fish, these same underwater floras all too often present an unavoidable snag for a fishhook. The same fishing tackle element that is responsible for snagging a fish—the hook—is susceptible itself to being snagged on underwater brush or weeds. Once the hook becomes snagged on weeds, brush, or another object, the opportunity to catch a fish on the same cast is virtually eliminated and the chances of that hook being lost are significant.

It has long been recognized that it would be advantageous to have a weedless fishhook that would shield the hook from weeds, brush or debris without interfering with the setting of the hook. Consequently, weedless fishing tackle of various types has been designed to prevent undesirable snags.

One such product is a weedless hook which includes a thin piece of wire extending from the shank and folded back on itself. This folded wire comprises one end with separate wire ends connected with the shank of the hook by solder and a second end in which the wire is integrally connected. The folded wire of this hook extends from the shank, through the eyelet and then outwardly for engagement with the hook portion.

A second product is a weedless jig disclosed in U.S. Pat. No. 4,864,766 issued to Bohn. This product includes a multiwire strand which is molded into the jig head and is then spread to form a weed deflector.

Although the weedless fishing tackle products of the prior art have been acceptable in many ways, there is a continuing need for a weedless fishhook or snell that prevents the hook from snagging on weeds or brush without interfering with the setting of the hook. A continuing need also exists for a method of making a weedless fishhook or snell

SUMMARY

The present invention is directed to a fishhook or snell that satisfies the need of preventing the hook from snagging weeds, brush or other objects while maintaining the hooking and setting ability when a fish strikes the hook. The present invention also satisfies the need for a method of making such hook or snell. The hook of the present invention comprises a shank, an eyelet, a hook portion and multiple wire strands extending outwardly in a fan shaped pattern from near the eyelet to near the sharp point of the hook to shield the hook from weeds, brush and the like. The multiple wire strands are preferably connected to the eyelet end of the shank by a line wrap, although other means are available as well.

The weedless hook of the present invention works by deflecting weeds and brush from the hook or by deflecting the hook away from the weeds and brush. That is, the multiple wire strands act as a shield for the hook, particularly the sharp end of the hook, and deflect the hook or such objects before they catch and snag the hook. The multiple wire strands are stiff enough to deflect weeds or the hook, but also allow the fish to easily bite down on the hook, without adversely affecting the ability to set the hook.

The method aspect of the present invention includes providing a finite length of multistrand wire. Preferably this is a twisted, multistrand wire of two or more strands, more preferably four or more strands and most preferably six or more strands. One end of this multistrand wire is positioned next to the eyelet end of the hook shank and connected to the shank by a line wrap. Preferably this is then secured by superglue or some other adhesive. Finally, the other end of this multistrand wire is bent toward the sharp end of the hook portion and the individual wires are spread.

The method of making the hook as described above, and the resulting hook itself, involves the synergistic and interactive nature of the elements and method steps of the invention. Specifically, the line wrap is a relatively high tensile strength material such that the wrap will deform and engage the knuckle-like contours of the bundle of strands to form mechanical engagements between the two components. Further, the wires must be stiff enough to form and function as a deflector and still ductile enough to withstand bending and reforming without breaking or rapidly fatiguing.

Accordingly, it is an object of the present invention to provide a weedless fishhook or snell.

Another object of the present invention is to provide a weedless fishhook or snell having a plurality of unconnected wires with free ends for deflecting the fishhook or snell or for deflecting weeds, brush or the like.

A still further object of the present invention is to provide a method of making a weedless fishhook or snell.

These and other features, aspects, and objects of the present invention will become better understood with regard to the following description, appended claims, and accompanying drawings.

DETAILED DESCRIPTION

Figure 1:
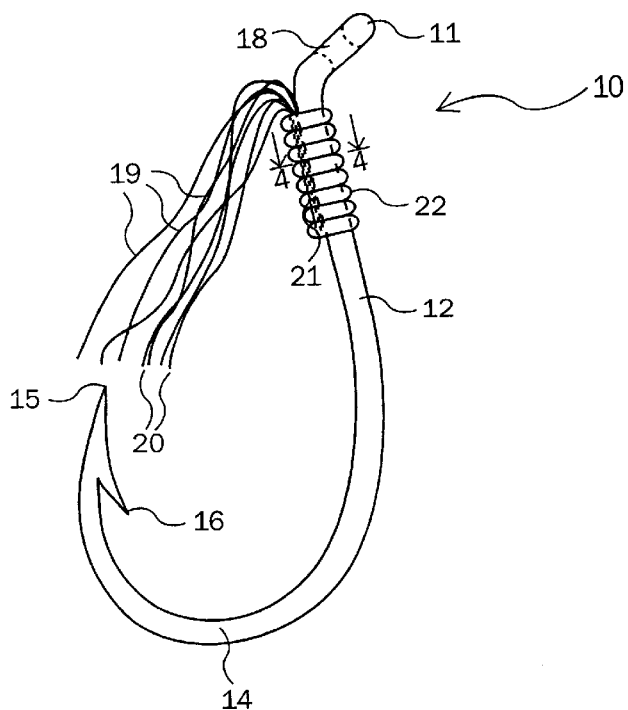
FIG. 1 is an elevational side view of the weedless fish hook of the present invention.
Figure 6:
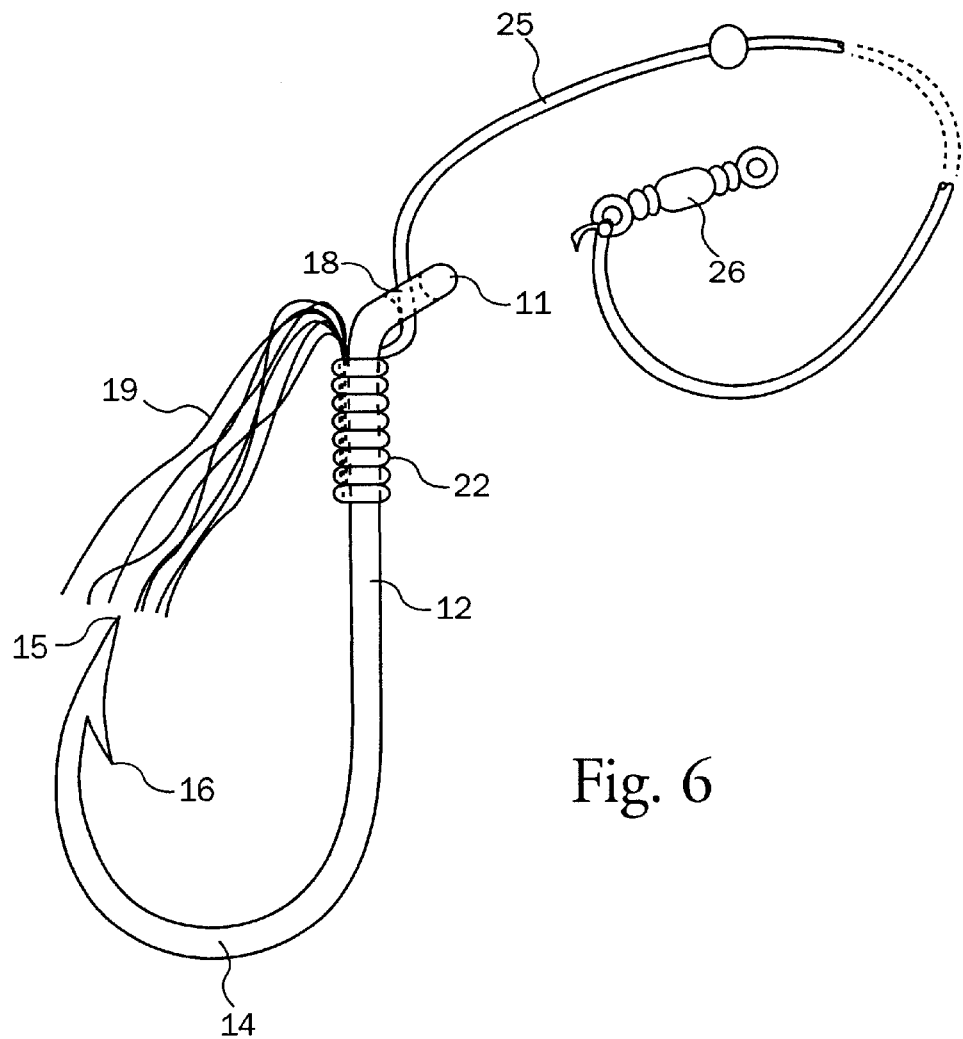
FIG. 6 is an elevational side view of a weedless snell in accordance with the present invention.

The weedless fishing tackle of the present invention may be embodied both in the form of a fishhook 10 as shown in FIG. 1 or as a snell as shown in FIG. 6. With reference to FIG. 1, the weedless fishhook 10 of the present invention is comprised of a hook having an eyelet 11, a shank 12 and a hook portion 14. As shown the eyelet 11 is integrally joined with the top or eyelet end of the shank 12 and includes a fishing line receiving opening 18 to connect the hook 10 to a fishing line (not shown). The lower or hook end of the shank 12 is integrally joined with one end of the hook portion 14. The other end of the hook portion 14 is a free end that terminates in a sharp point 15. The free end of the hook portion 14 also preferably includes a barb 16. If desired, the barb 16 can be eliminated to provide a barbless hook.

A plurality of weed or hook deflecting members 19 extend outwardly and downwardly from near the top end of the shank 12. As shown best in FIG. 2, these members 19 also extend laterally outwardly in a fan shaped pattern as they extend downwardly from the shank 12. The members 19 comprise individual strands of material which terminate in free, unconnected ends 20. These individual strands can be made of a variety of materials including various forms of metal or metal alloys and various forms of synthetic materials, among others. Such materials may include brass, bronze, stainless steel, copper alloys, tungsten and titanium alloys, and the like and should be of sufficient stiffness to deflect the hook or weeds and thus reduce the tendency of the hook to snag on such weeds. At the same time, the stiffness of the material must not be so great as to interfere with the catching of the fish or the setting of the hook. Still further, the material must be ductile enough to withstand repeated bending and reforming without breaking or fatiguing.

In the preferred embodiment, the members 19 comprise wire strands of a stiff metal or metal alloy such as stainless steel, brass, bronze, and tungsten and titanium alloys, copper alloys, among others. The preferred diameter of these individual wire strands 19 is between about 0.002 and 0.06 inches. The free ends 20 of the members 19 extend sufficiently close to the sharp end 15 to provide the function of preventing or reducing the tendency of weeds or the like from being snagged by the sharp end 15.

In the structure of the preferred embodiment, the individual wire strands 19 are part of a twisted multiple wire strand bundle with a twisted wire strand connection end. Such multiple wire strand bundle includes two or more strands 19 to as many as seven or more strands 19. The most preferred structure includes a twisted strand connection end 21 having seven individual strands 19. The multiple wire strand connection end 21 is connected to the top end of the shank 12 by any one of a variety of means such as by solder, by an appropriate adhesive, or by a monofilament or other line wrap 22 shown in the figures of the present invention as the preferred embodiment. Preferably, the strand connection end 21 is generally parallel and adjacent to the shank when it is connected therewith.

Figure 5:
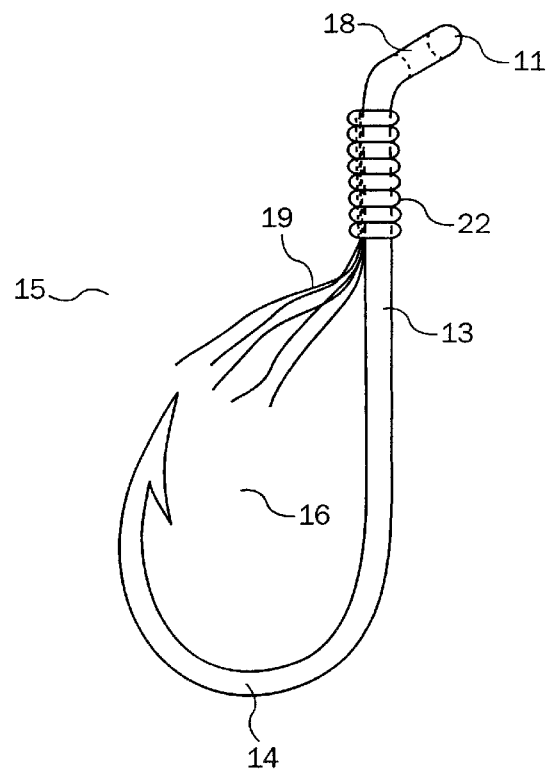
FIG. 5 is an elevational side view of a further embodiment of the fishhook of the present invention.

As shown in FIGS. 1 and 5, the connection end 21 can be connected to the shank in several ways. In FIG. 1, the strand 21 is connected with the shank 12 such that the individual strands 19 extend downwardly and outwardly from the top end of the shank at the very top of the eyelet end of the shank 12. In FIG. 5 comprising a hook with a longer shank 13, the strand 21 is connected with the shank 13 such that the individual strands 20 extend downwardly and outwardly from the shank 13 at a point spaced downwardly from the eyelet end.

Figure 2:
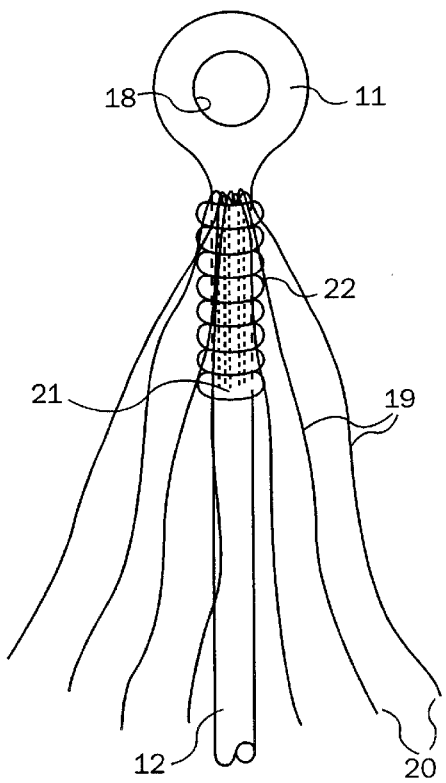
FIG. 2 is an elevational front view of the eyelet and upper shank portion of the fishhook of the present invention.
Figure 3:
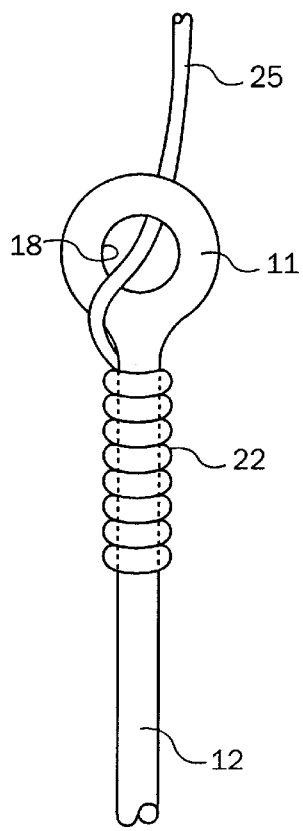
FIG. 3 is an elevational back view of the eyelet and upper shank portion of the fishhook of the present invention.
Figure 4:
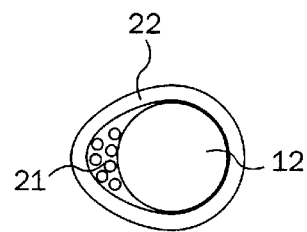
FIG. 4 is a view partially in section as viewed along the section line 4—4 of FIG. 1.

In the preferred embodiment as shown best in FIGS. 1, 2 and 4, the portion of the multiple wire strand 21 connected to the shank 12 (FIG. 1) is positioned substantially on the front side of the shank 12 and connected to that side. As used in this application, the front side of the shank 12 is that side facing the hook portion 14.

FIG. 6 shows the weedless hook of the present invention in a snell embodiment with a length of monofilament fishing line 25 extending from the line wrap 22 and then upwardly and forwardly through the opening 18 to the eyelet 11. The free end of fishing line 25 is connected to a line connection member such as a swivel 26 or the like. If desired, a bead 28 may be slideably connected with the line 25.

Figure 7:
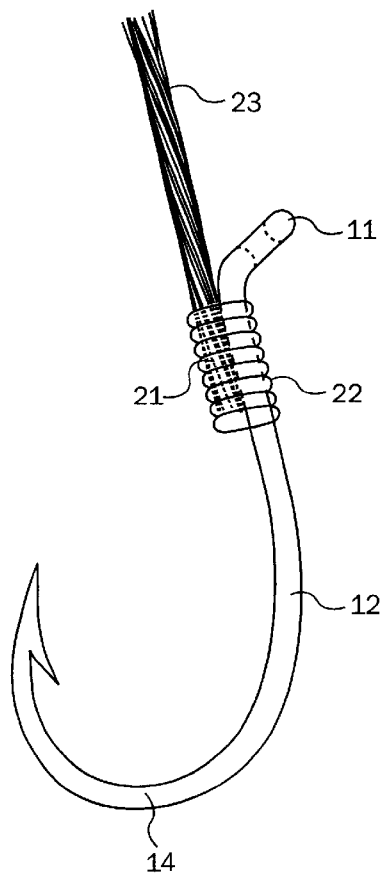
FIG. 7 is an elevational side view showing a first stage of making the fishhook or snell of the present invention.
Figure 8:
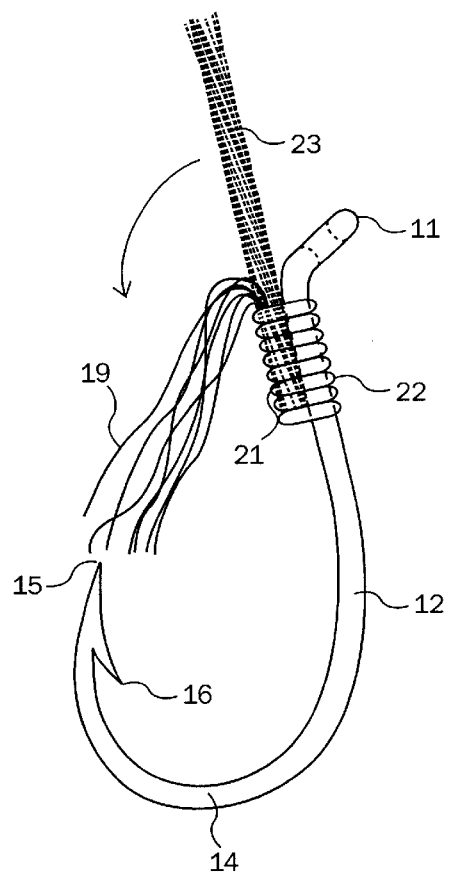
FIG. 8 is an elevational side view showing a further stage of making the fishhook or snell of the present invention.

The method of making a weedless fishhook or snell in accordance with the present invention is shown best in FIGS. 7 and 8. The first step in the method is to position a plurality of wire strands in a position adjacent to and generally parallel with the shank 12. Although the strands may be positioned on the front, the back or the side of the shank 12, they are preferably positioned adjacent to the shank on the front side as shown in FIG. 7. These plurality of strands may be individually so positioned, if desired, but are preferably positioned as a strand bundle 23 in which at least the individual strands of the strand portion 21 to be connected to the shank 12 are bundled such as by twisting or otherwise held together prior to connection to the shank 12. Preferably, the entire strand bundle 23 is a twisted multiple wire strand. Alternatively, only the strand portion 21 can be joined as a twisted wire bundle or secured together by adhesive or the like.

Next, the strand portion 21 is connected to the shank 12 by any appropriate means. Preferably, this connection is via a line wrap as shown, but such connection can, if desired, also be made via solder or via an adhesive. The line wrap in the preferred embodiment is with monofilament or other fishing line, although the connection can also be achieved with a wire wrap using a thin brass, copper or other metal wire. Preferably a drop of superglue or other adhesive is applied to the wrap 22 after securement to ensure a solid and permanent connection.

Although the adhesive or other bonding agent functions to some extent in the normal manner of securing one element to another, the adhesive or other bonding agent functions to interact with the twisted wire strands to mechanically lock the strands into relationship with each other and to prevent them from becoming disengaged from the bundle. This latter function is a result of the adhesive solidifying. The same is true with respect to the line or wire wrap as the adhesive or other bonding agent flows between the wrap and the knuckle contours of the wire bundle and the shank of the hook.

If the weedless tackle of the present invention is to be used as a fishhook, the linewrap 22 is clipped after being wrapped. If it is to be used as a snell, the line of the linewrap 22 is threaded up through the eyelet 11 as shown in FIG. 6.

After the strand portion 21 is connected to the shank 12, the individual strands 19 are then untwisted and separated and spread into a fan shaped configuration and bent so that they extend downwardly and outwardly toward the sharp point 15 as shown. If the strands 19 are separated prior to the portion 21 being connected to the shank 12, the strands 19 are simply bent downwardly and outwardly after connection to the shank. If the strand is connected to a longer hook such as is shown in FIG. 5, the strands 19 are only bent outwardly toward the hook point 15 after connection to the shank.

Although the strand connection end 21 can be connected to the shank 12 in a variety of ways, the preferred way is to secure the connection end 21 in a position generally parallel and adjacent to the shank 12 by a line wrap such as is shown in the drawings. Such wrap provides attachment of the multiple strand connection end 21 to the shank 12 via a plurality of mechanical locking mechanisms. First, the spiral kinking of the individual strands in the twisted connection end 21 by the wrap 22 holds the individual strands of the bundle against the shank 12. Second, attachment results from friction due to the large surface areas of contact between the strands and the shank and the strands and the wrap. This benefit is enhanced by the embedding of the wrap material into the strands and the strands embedding into the wrap material. Thirdly, the helical geometry of the strands when the wire bundle is twisted, provides knuckle-like nodes that mechanically become engaged with the wrap. Such attachment mechanisms provide highly beneficial and unexpected results.

Accordingly, the present invention embodies the synergistic and interactive nature of the various components including the twisted wire bundle and the line wrap and/or adhesive or other bonding agent to secure a bundle of stiff wires to the shank of a hook. This securement must be sufficient to withstand the rigors of use of the hook and the repeated bending, twisting and reforming of the wires.

Although the present invention has been described in considerable detail with reference to certain preferred versions thereof. Other versions are possible. Therefore, the spirit and scope of the appended claims should not be limited to the description of the preferred version contained therein.

What is claimed is:

1. A fishhook comprising:
   a hook having an eyelet, a shank, and a hook portion, said shank having an eyelet end connected to said eyelet and an opposite end connected to a first end of said hook portion, a second end of said hook portion terminating at a free end; and
   more than two individual deflector strands connected to said shank, said strands having free unconnected ends extending outwardly and downwardly from said shank toward said free end of said hook portion and opposite connection ends connected to said shank along said shank, wherein said strands extend outwardly from said shank at a point between said connection ends and said eyelet end.

2. The fishhook of claim 1 wherein said strands are relatively stiff and are constructed of a metal or a metal alloy.

3. The fishhook of claim 2 wherein said strands are constructed of a copper alloy.

4. A fishhook comprising:
   a hook having an eyelet, a shank, and a hook portion, said shank having an eyelet end connected to said eyelet and an opposite end connected to a first end of said hook portion, a second end of said hook portion terminating at a free end; and more than two individual deflector strands connected to said shank, said strands having free unconnected ends extending outwardly and downwardly from said shank toward said free end of said hook portion and opposite connection ends connected to said shank along said shank, wherein said strands extend outwardly from said shank at a point between said connection ends and said eyelet end.

5. The fishhook of claim 4 including five or more individual strands.

6. A fishhook comprising:
   a hook having an eyelet, a shank, and a hook portion, said shank having an eyelet end connected to said eyelet and an opposite end connected to a first end of said hook portion, a second end of said hook portion terminating at a free end;
   more than two individual deflector strands connected to said shank, said strands having free unconnected ends extending outwardly and downwardly from said shank toward said free end of said hook portion and opposite connection ends connected to said shank along said shank; and
   a line wrap encircling said connection ends and shank a plurality of times to connect said connection ends to said shank.

7. The fishhook of claim 6 wherein said line wrap is comprised of a length of fishing line wrapped around said shank and a portion of said strands, said line having a free end extending through said eyelet and connected to a line connection member.

8. The fishhook of claim 7 wherein said line connection member is a swivel.

9. A method of making a weedless fishhook comprising:
   providing a fishhook having an eyelet, a shank connected with said eyelet and a hook portion connected with said shank, said hook portion terminating in a hook free end;
   providing a bundle of deflector strands comprising two or more relatively stiff deflector strands, each of said deflector strands comprising a free strand end, and a connection portion;
   positioning said connection portions of said strands adjacent to a portion of said shank;
   connecting said connection portions to said portion of said shank; and
   bending said strands so that said free strand ends extend outwardly and downwardly from said shank toward said hook free end.

10. The method of claim 9 including connecting said bundle to said shank by a line wrap.

11. The method of claim 10 including applying an adhesive onto said line wrap.

12. The method of claim 9 including providing said strands in a twisted wire bundle.

13. The method of claim 12 including untwisting and separating the strands at said free end.

14. The method of claim 13 including bending said strands at the juncture point between said connection end portion and said free end portion so that said free end portions of said strands extend in a fan shaped pattern toward said hook free end.

15. The method of claim 9 wherein said bundle is a twisted bundle of deflector wires.

16. The method of claim 15 including untwisting said twisted bundle.

17. The method of claim 9 wherein said positioning step includes positioning said connection ends so that said free ends extend past said eyelet.

18. A fishhook comprising:
   a hook having an eyelet, a shank, and a hook portion, said shank having an eyelet end connected to said eyelet and an opposite end connected to a first end of said hook portion, wherein said hook portion includes a second end terminating at a hook free end;
   a plurality of individual deflector strands connected to said shank, but not extending through said eyelet, wherein said strands each have a first free strand end and an opposite second free strand end, said first free strand end extending outwardly and downwardly from said shank toward said hook free end, and wherein said strands each include a connection portion adjacent to said second free strand end which is connected to said shank along a portion of said shank; and
   a line wrap encircling said connection portion and shank a plurality of times to connect said connection portion to said shank.

* * * * *